United States Patent [19]
Moore

[11] Patent Number: 6,050,396
[45] Date of Patent: Apr. 18, 2000

[54] ADJUSTABLE GUIDE RAIL FOR TRANSPORTING PRODUCTS

[76] Inventor: Leslie A. Moore, 3146 Fiesta Dr., Dunedin, Fla. 34698

[21] Appl. No.: 09/158,961

[22] Filed: Sep. 22, 1998

[51] Int. Cl.[7] .................................................. B65G 15/00
[52] U.S. Cl. .................................... 198/836.3; 198/836.1; 198/626.1
[58] Field of Search .............................. 198/836.3, 836.1, 198/626.1; 464/51

[56] References Cited

U.S. PATENT DOCUMENTS

| | | |
|---|---|---|
| 3,313,400 | 4/1967 | Johnson . |
| 5,016,747 | 5/1991 | Veenhof ................................... 198/525 |
| 5,156,260 | 10/1992 | Dorner et al. ........................... 198/813 |
| 5,211,280 | 5/1993 | Houde ..................................... 198/836.3 |
| 5,238,240 | 8/1993 | Prim et al. ............................... 271/299 |
| 5,356,340 | 10/1994 | Miller et al. ............................. 464/87 |
| 5,513,743 | 5/1996 | Brink ....................................... 198/836.1 |
| 5,515,668 | 5/1996 | Hunt et al. ............................... 53/543 |
| 5,517,798 | 5/1996 | Klopfenstein ........................... 53/249 |
| 5,676,239 | 10/1997 | Mason ..................................... 198/836.1 |
| 5,752,593 | 5/1998 | Miyamoto et al. ...................... 198/456 |
| 5,820,464 | 10/1998 | Parlato ..................................... 464/58 |

Primary Examiner—Christopher P. Ellis
Assistant Examiner—Jeffrey A. Shapiro

[57] ABSTRACT

An adjustable guide rail system for transporting products is disclosed. The system comprises a pair of parallel conveyor side panels having upper surfaces in a common plane. A conveyor chain is formed as a plurality of rectangular slats having lower surfaces slidable along the upper surfaces of the conveyor side panel. The upper surfaces of the slats function for the receipt of products to be conveyed. A plurality of spacers/adjuster slide blocks are located at spaced apart locations between the conveyor side panels. The spacers/adjuster slide blocks have central apertures axially aligned therein. A plurality of pairs of parallel oriented adjuster slides are mounted for axial movement above and below the apertures of the spacer/adjuster slide blocks. The adjuster slide of each pair having gear teeth in linear alignment, thereby constituting racks. An adjustor gear with gear key for each pair of slides is formed in a cylindrical orientation constituting a pinion mounted with an aperture aligned with the apertures of the spacer/adjuster slide blocks. A product guide rail is located on each side of the path of travel above the conveyor chain and is coupled with respect to the upper ends of the adjustable rail support. Lastly, an adjustable drive rod couples the adjustable gears for simultaneous rotation therewith.

6 Claims, 4 Drawing Sheets

ADJUSTABLE GUIDE RAIL FOR TRANSPORTING PRODUCTS

BACKGROUND OF THE INVENTION

1. Field of the Invention

The present invention relates to a new and improved adjustable guide rail system for transporting products along a path of travel and, more particularly, pertains to adjusting the size capabilities of conveyor systems.

2. Description of the Prior Art

The use of conveyor systems of known designs and configurations is known in the prior art. More specifically, conveyor systems of known designs and configurations heretofore devised and utilized for the purpose of adjusting conveyors for products of various sizes through known methods and apparatuses are known to consist basically of familiar, expected, and obvious structural configurations, notwithstanding the myriad of designs encompassed by the crowded prior art which has been developed for the fulfillment of countless objectives and requirements.

The prior art discloses a large number of conveyor systems of known designs and configurations.

In this respect, the adjustable guide rail system for transporting products along a path of travel according to the present invention substantially departs from the conventional concepts and designs of the prior art, and in doing so provides an apparatus primarily developed for the purpose of adjusting the size capabilities of conveyor systems.

Therefore, it can be appreciated that there exists a continuing need for a new and improved adjustable guide rail system for transporting products along a path of travel which can be used for adjusting the size capabilities of conveyor systems. In this regard, the present invention substantially fulfills this need.

SUMMARY OF THE INVENTION

In view of the foregoing disadvantages inherent in the known types of conveyor systems of known designs and configurations now present in the prior art, the present invention provides a new and improved adjustable guide rail system for transporting products along a path of travel. As such, the general purpose of the present invention, which will be described subsequently in greater detail, is to provide a new and improved adjustable guide rail system for transporting products along a path of travel and methods which have all the advantages of the prior art and none of the disadvantages.

To attain this, the present invention essentially comprises a new and improved adjustable guide rail for transporting products along a path-of travel and with adjustment capabilities for various size products comprising, in combination, a pair of parallel conveyor side panels, the conveyor side panels having upper surfaces in a common plane; a conveyor chain formed as a plurality of rectangular slats having lower surfaces slidable along the upper surfaces of the conveyor side panel and having upper surfaces for the receipt of products to be conveyed; a plurality of spacers/adjuster slide blocks located at spaced apart locations between the conveyor side panels, the spacers/adjuster slide blocks having central apertures axially aligned therein; a plurality of pairs of parallel oriented adjuster slides mounted for axial movement above and below the apertures of the spacer/adjuster slide blocks, the adjuster slide of each pair having gear teeth in linear alignment thereby constituting racks; an adjustor gear with gear key for each pair of slides formed in a cylindrical orientation constituting a pinion mounted with an aperture aligned with the apertures of the spacer/adjuster slide blocks; a wiper seal located interiorly of the spacer/adjuster slide blocks with apertures for the passage therethrough of the adjuster slides to assure dust-free operation; adjustable rail supports having lower ends secured to the exterior ends of the adjuster slides and having upper ends extending above the path of travel of the conveyor chain; a product guide rail located on each side of the path of travel above the conveyor chain and coupled with respect to the upper ends of the adjustable rail support; a product guide rail spacer located between the adjustable rail supports and the product guide rails; an adjustable drive right angle gearbox for the operator control and rotation of the adjustable gears simultaneously; an adjustable drive rod coupling the adjustable guide right angle gear box and the adjustable gears for simultaneous rotation therewith; securing bolts securing the conveyor side panels with the spacer/adjuster slide blocks; and an adjustable handle exterior of the conveyor side panels for an operator's rotation of the adjustable drive rod.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved adjustable guide rail system for transporting products along a path of travel which has all the advantages of the prior art conveyor systems of known designs and configurations and none of the disadvantages.

It is another object of the present invention to provide a new and improved adjustable guide rail system for transporting products along a path of travel which may be easily and efficiently manufactured and marketed.

It is a further object of the present invention to provide a new and improved adjustable guide rail system for transporting products along a path of travel which is of a durable and reliable construction.

An even further object of the present invention is to provide a new and improved adjustable guide rail system for transporting products along a path of travel which is susceptible of a low cost of manufacture with regard to both materials and labor, and which accordingly is then susceptible of low prices of sale to the consuming public, thereby making such a adjustable guide rail system for transporting products economically available to the buying public.

Even still another object of the present invention is to adjust the size capabilities of conveyor systems.

Lastly, it is an object of the present invention to provide an adjustable guide rail system for transporting products comprising a pair of parallel conveyor side panels, the conveyor side panels having upper surfaces in a common plane; a conveyor chain formed as a plurality of rectangular slats having lower surfaces slidable along the upper surfaces of the conveyor side panel and having upper surfaces for the receipt of products to be conveyed; a plurality of spacers/adjuster slide blocks located at spaced apart locations between the conveyor side panels, the spacers/adjuster slide blocks having central apertures axially aligned therein; a plurality of pairs of parallel oriented adjuster slides mounted for axial movement above and below the apertures of the spacer/adjuster slide blocks, the adjuster slide of each pair having gear teeth in linear alignment thereby constituting racks; an adjustor gear with gear key for each pair of slides formed in a cylindrical orientation constituting a pinion mounted with an aperture aligned with the apertures of the spacer/adjuster slide blocks; a product guide rail located on each side of the path of travel above the conveyor chain and coupled with respect to the upper ends of the adjustable rail support; and an adjustable drive rod coupling the adjustable gears for simultaneous rotation therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
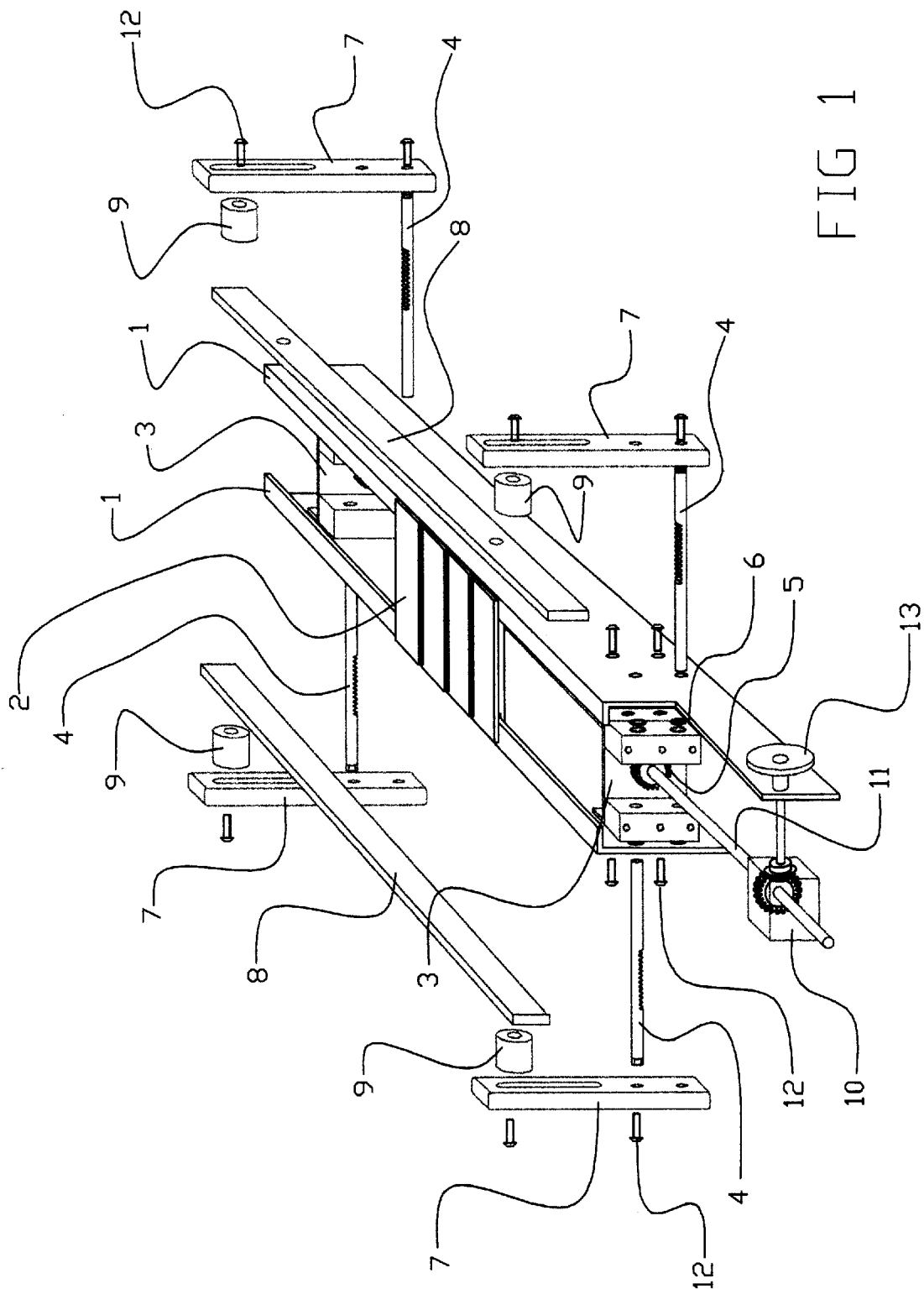
FIG. 1 is an exploded perspective illustration of the new and improved adjustable guide rail system for transporting products along a path of travel constructed in accordance with the primary embodiment of the present invention.
Figure 2:
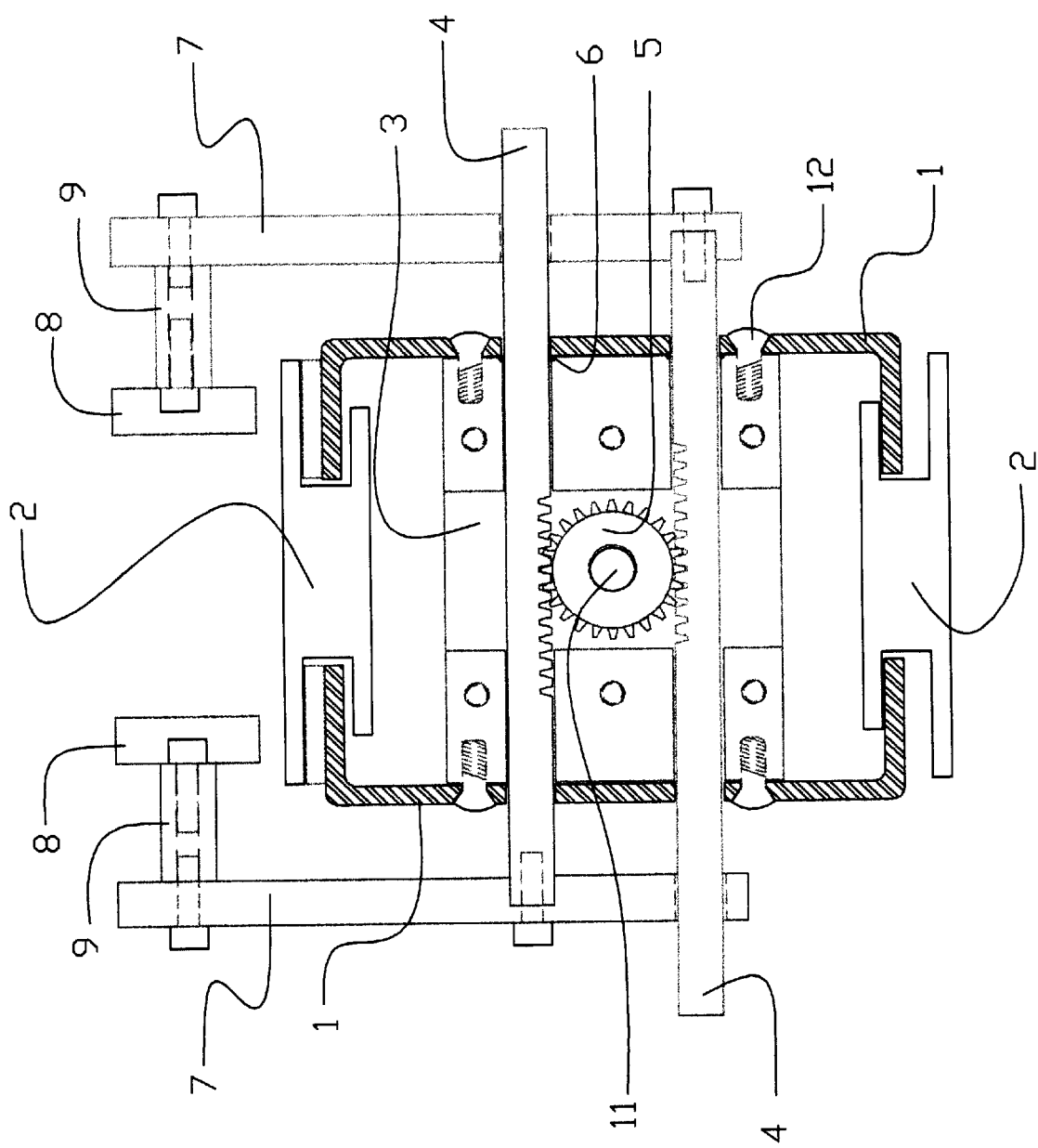
FIG. 2 is a cross-sectional view taken vertically through the apparatus shown in FIG. 1.

With reference now to the drawings, and in particular to FIGS. 1 through 4 thereof, the new and improved adjustable guide rail system for transporting products along a path of travel embodying the principles and concepts of the present invention and generally designated by the reference numeral (10) will be described.

The present invention, the new and improved adjustable guide rail system for transporting products along a path of travel, is a system (10) comprised of a plurality of components. Such components, in their broadest context, include conveyor side panels, a conveyor chain, slide blocks, adjuster slides, an adjustor gear, a wiper seal, rail supports, a product guide rail, a guide rail spacer, a gearbox, a drive rod, securing bolts and a handle. Each of the individual components is specifically configured and correlated one with respect to the other so as to attain the desired objectives.

The present invention is a new and improved adjustable guide rail system. The system is for transporting products along a path of travel and has adjustment capabilities for various size products. The system comprises, in combination, a pair of parallel conveyor side panels (1). The conveyor side panels have upper surfaces in a common plane.

Next provided is a conveyor chain (2) formed as a plurality of rectangular slats. The slats have lower surfaces slidable along the upper surfaces of the conveyor side panel and upper surfaces for the receipt of products to be conveyed.

Further provided is a plurality of spacers/adjuster slide blocks (3) located at spaced apart locations between the conveyor side panels. The spacers/adjuster slide blocks have central apertures axially aligned therein.

Additionally provided is a plurality of pairs of parallel oriented adjuster slides (4) mounted for axial movement above and below the apertures of the spacer/adjuster slide blocks. The adjuster slide of each pair have gear teeth in linear alignment thereby constituting racks.

Next provided is an adjustor gear (5) with gear key for each pair of slides formed in a cylindrical orientation constituting a pinion mounted with an aperture aligned with the apertures of the spacer/adjuster slide blocks.

A wiper seal (6) is next provided. The wiper seal is located interiorly of the spacer/adjuster slide blocks with apertures for the passage therethrough of the adjuster slides to assure dust-free operation.

Further provided are adjustable rail supports (7) having lower ends secured to the exterior ends of the adjuster slides and having upper ends extending above the path of travel of the conveyor chain.

Additionally provided is a product guide rail (8) located on each side of the path of travel above the conveyor chain. The guide rail is coupled with respect to the upper ends of the adjustable rail supports.

Also provided is a product guide rail spacer (9). The rail spacer is located between the adjustable rail supports and the product guide rails.

An adjustable drive right angle gearbox (10) for the operator control and rotation of the adjustable gears simultaneously is next provided.

Further, an adjustable drive rod (11) is provided for coupling the adjustable guide right angle gear box and the adjustable gears for simultaneous rotation therewith.

Next provided are securing bolts (12) securing the conveyor side panels with the spacer/adjuster slide blocks.

Lastly provided is an adjustable handle (13) exterior of the conveyor side panels for an operator's rotation of the adjustable drive rod.

Figure 3:
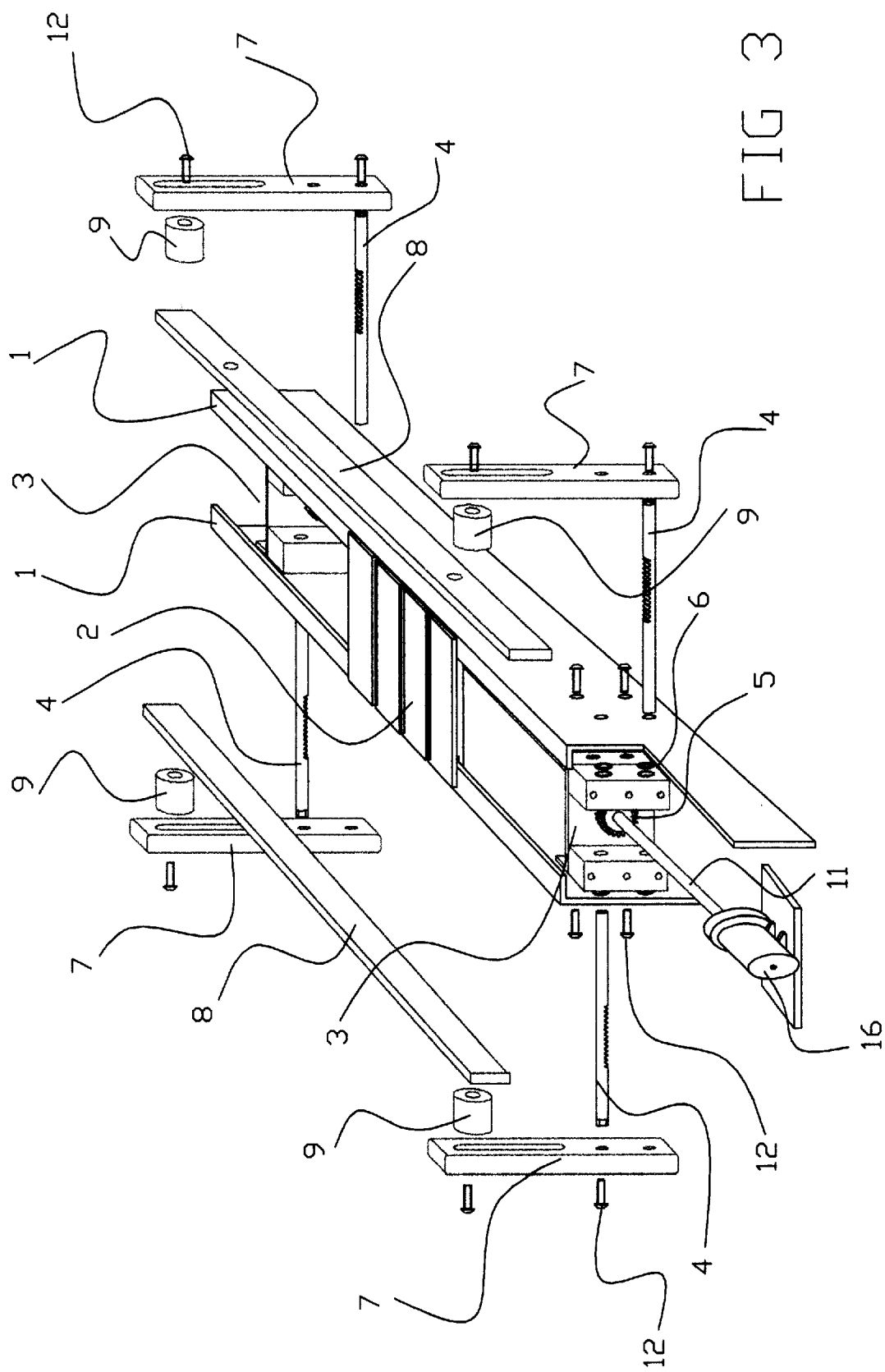
FIG. 3 is an exploded perspective view similar to FIG. 1, but illustrating an alternate embodiment of the present invention with automatic adjustment capabilities.

In the second embodiment, that shown in FIG. 3, the adjustable drive right angle gearbox for controlling the system is replaced with a motor (16). More specifically, this embodiment includes an adjustable drive gear motor (16). The motor is for the automatic rotation of the adjustable drive rod with a remote control mechanism for activating and inactivating the drive gear motor.

Figure 4:
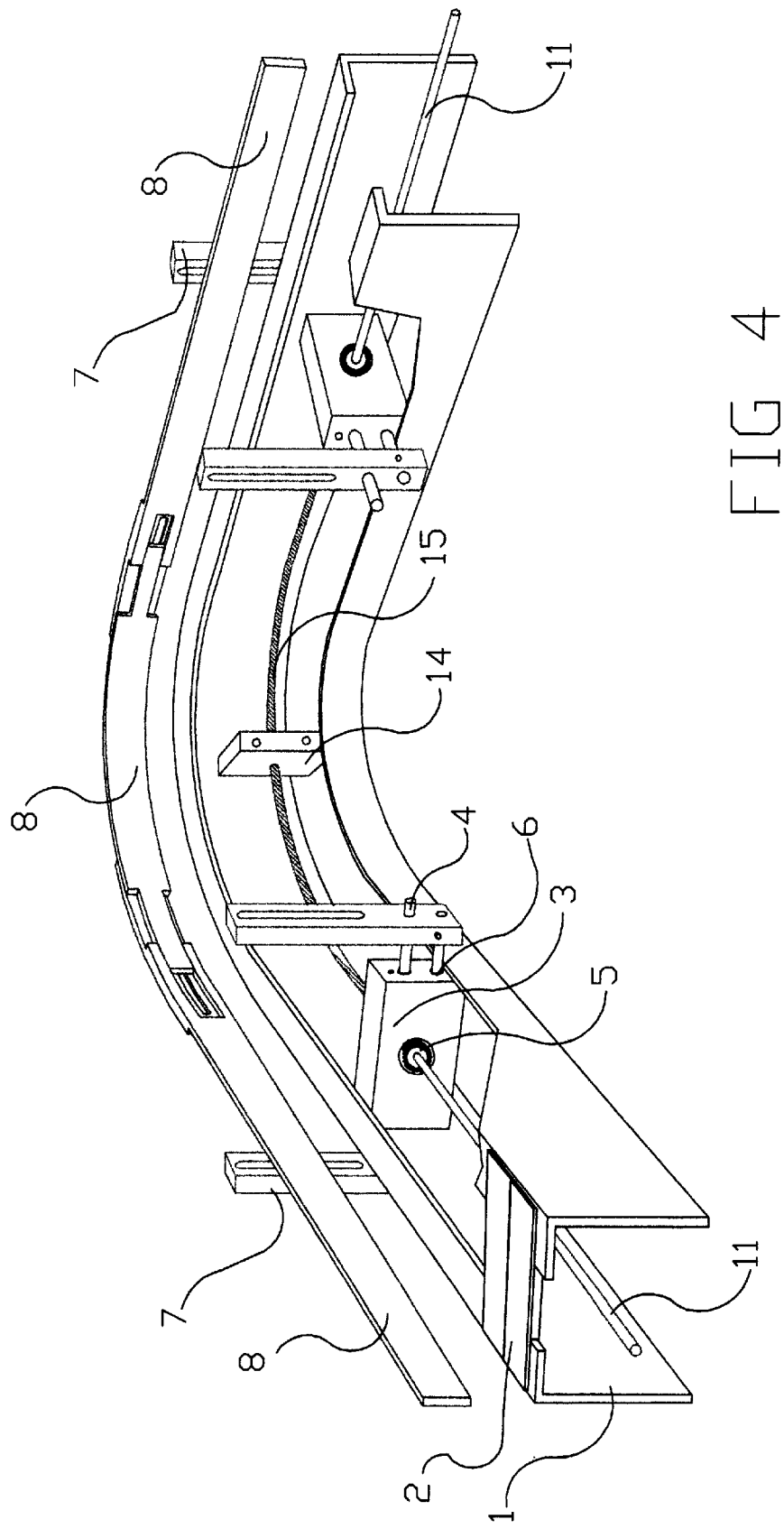
FIG. 4 is a second alternate embodiment adapted to be used with either the primary or secondary embodiment for allowing the transportation of products around corners.

Lastly, in the second alternate embodiment, that shown in FIG. 4, the device is adapted for conveying products in other than a straight line. To this end, there is provided a flexible drive guide (14). The flexible drive guide couples segments of the adjustable drive rod for effecting the curving of the drive mechanisms for the system.

In association therewith, the portions of the flexible drive rod (11) are formed of a flexible drive (15). The flexible drive functions to couple the drive gear and the adjacent drive rods whereby rotation of one end of the drive rod will effect rotation of the remaining portions of the drive rod including those curved portions on opposite sides of the flexible drive guide (14).

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved adjustable guide rail for transporting products of various sizes along a path of travel comprising, in combination:

a pair of parallel conveyor side panels, the conveyor side panels having upper surfaces in a common plane;

a conveyor chain formed as a plurality of rectangular slats having lower surfaces slidable along the upper surfaces of the conveyor side panel and having upper surfaces for the receipt of products to be conveyed;

a plurality of spacers/adjuster slide blocks located at spaced apart locations between the conveyor side panels, the spacers/adjuster slide blocks having central apertures axially aligned therein;

a plurality of pairs of parallel oriented adjuster slides mounted for axial movement above and below the apertures of the spacer/adjuster slide blocks, the adjuster slide of each pair having gear teeth in linear alignment thereby constituting racks;

an adjustor gear for each pair of slides, the adjuster gear formed in a cylindrical orientation constituting a pinion mounted with an aperture aligned with the apertures of the spacer/adjuster slide blocks;

a wiper seal located at the spacer/adjuster slide blocks with apertures for the passage therethrough of the adjuster slides to assure dust-free operation;

adjustable rail supports having lower ends secured to the exterior ends of the adjuster slides and having upper ends extending above the path of travel of a conveyor chain;

a product guide rail located on each side of the path of travel above the conveyor chain and coupled with respect to the upper ends of the adjustable rail support;

a product guide rail spacer located between the adjustable rail supports and the product guide rails;

an adjustable drive right angle gearbox for the operator control and simultaneous rotation of the adjustable gears;

an adjustable drive rod coupling the adjustable guide right angle gear box and the adjustable gears for simultaneous rotation therewith;

securing bolts securing the conveyor side panels with the spacer/adjuster slide blocks; and an adjustment handle exterior of the conveyor side panels for an operator's rotation of the adjustable drive rod.

2. A adjustable guide rail system for transporting products comprising:

a pair of parallel conveyor side panels, the conveyor side panels having upper surfaces in a common plane;

a conveyor chain formed as a plurality of rectangular slats having lower surfaces slidable along the upper surfaces of the conveyor side panel and having upper surfaces for the receipt of products to be conveyed;

a plurality of spacers/adjuster slide blocks located at spaced apart locations between the conveyor side panels, the spacers/adjuster slide blocks having central apertures axially aligned therein;

a plurality of pairs of parallel oriented adjuster slides mounted for axial movement above and below the apertures of the spacer/adjuster slide blocks, the adjuster slide of each pair having gear teeth in linear alignment thereby constituting racks;

an adjustor gear with gear key for each pair of slides formed in a cylindrical orientation constituting a pinion mounted with an aperture aligned with the apertures of the spacer/adjuster slide blocks;

a product guide rail located on each side of the path of travel above the conveyor chain and coupled with respect to the upper ends of the adjustable rail support; and an adjustment drive rod coupling the adjustable gears for simultaneous rotation therewith;

a curving drive coupling, coupling linear segments of the adjustable drive rod for effecting linear curving of the drive mechanisms for the system; and a guide at an intermediate extent of the curving drive for support purposes.

3. The system as set forth in claim 2 and further including a wiper seal located interiorly of the spacer/adjuster slide blocks with apertures for the passage therethrough of the adjuster slides to assure dust-free operation.

4. The system as set forth in claim 2 and further including a product guide rail spacer located between the adjustable rail supports and the product guide rails.

5. The system as set forth in claim 2 and further including an adjustable drive right angle gearbox for the operator control and rotation of the adjustable gears simultaneously; and an adjustable handle exterior of the conveyor side panels for an operator's rotation of the adjustable drive rod.

6. The system as set forth as claim 2 and further including an adjustable drive gear motor for the automatic rotation of the adjustable drive rod with a remote control mechanism for activating and inactivating the drive gear motor.

* * * * *